Patented Mar. 9, 1954

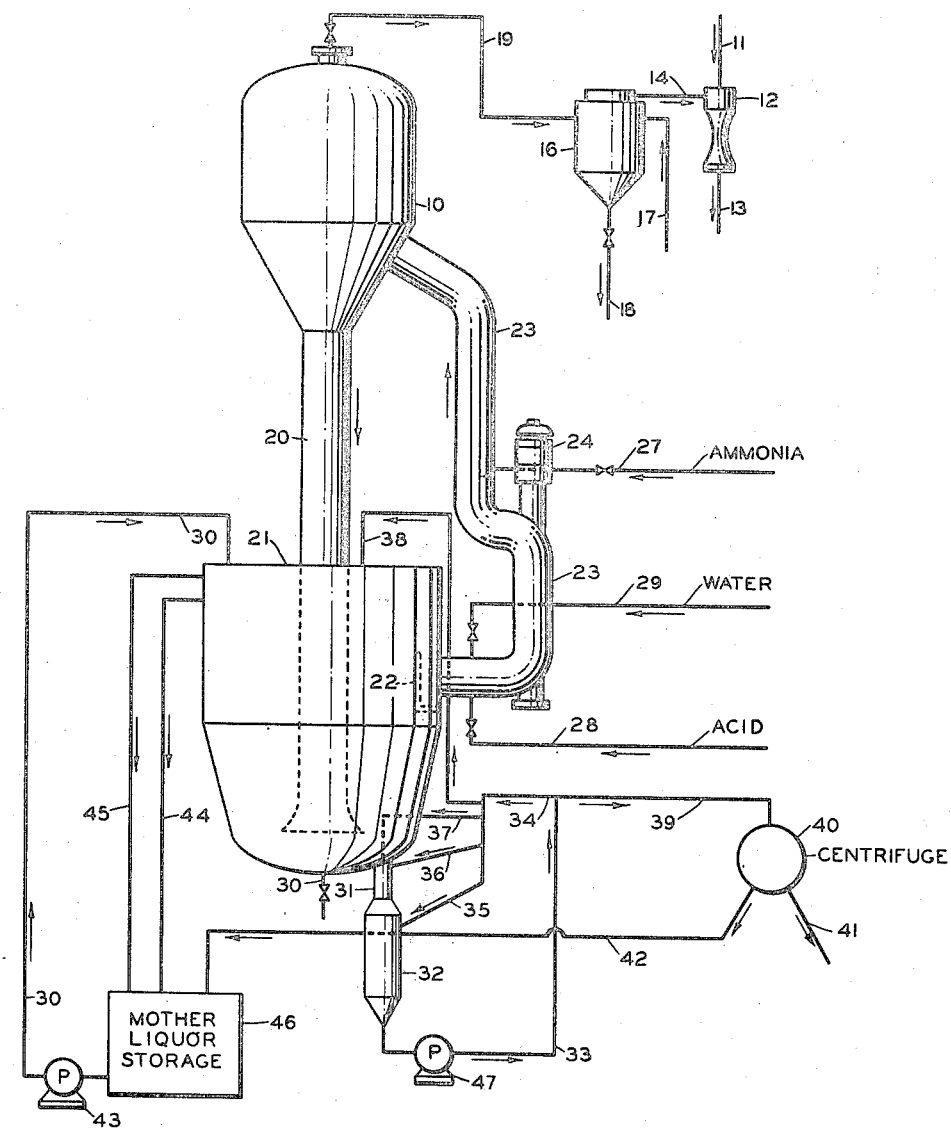

2,671,716

UNITED STATES PATENT OFFICE 2,671,716

PROCESS FOR THE OPERATION OF AN EVAPORATIVE CRYSTALLIZATION APPARATUS

Elwyn C. Ayres, Pasadena, Tex., assignor to Phillips Petroleum Company, a corporation of Delaware Application November 10, 1949, Serial No. 126,599

3 Claims. (Cl. 23—295)

This invention relates to the production of crystals of crystallizable materials. In one of its more specific aspects it relates to the production of crystals of organic and inorganic compounds. In a still more specific aspect it relates to the manufacture of crystalline materials of uniform size. In one specific embodiment this invention relates to improved crystallizer operation for producing crystals of ammonium salts such as ammonium sulfate, ammonium nitrate, etc.

In the art of crystallization many processes and apparatus have been developed in attempts to improve the quality of crystalline materials obtainable. Of the crystallization units thus produced there are those which manufacture crystals by the evaporation of a solvent from the crystallizable material. Of these apparatus, the Oslo or Krystal types of evaporative crystallizers have been used with particular advantage and it is with an improved process for operating such evaporative crystallizers that this invention deals. In operating such an apparatus, a solution of a material to be crystallized or reactants forming a solution of a crystallizable material are introduced to the evaporative crystallizer in such a manner that they pass first through the evaporation zone where the solvent is removed usually by a reduction in pressure along with moderate heating. Heating is used particularly when reactants are introduced to the crystallizer which give off a heat of reaction during the formation of the crystallizable material. Such an apparatus may also be operated by utilizing reduction in pressure and cooling, however this is usually considerably more expensive in as much as suitable refrigeration equipment must be supplied. By these methods of evaporation of the solvent the solution of crystallizable material becomes concentrated to such an extent that the degree of saturation passes through the metastable region thus causing initial crystal nuclei to form. Following such nucleation the saturation of the mother liquor, as it is called, is maintained such that a minimum of new crystal nuclei will be formed and the crystal nuclei present will be allowed to grow to within a suitable size range. When the crystals have reached the desired size, which in many cases may not be controlled with any great degree of accuracy, the crystals are continuously withdrawn from the crystallization zone in the form of a crystal magma which comprises a mixture of solid crystals and saturated liquor. The thus withdrawn magma is then passed to suitable separation equipment such as centrifuges, settlers, thickeners, and the like.

A particular problem which has arisen in this type of crystallization is the salting up or solidifying of crystals in the withdrawal lines from the crystallization zone of the evaporative crystallizer. Since it is desirable to pass a magma of a relatively high crystal solids content, such as in the range of say 35 to 70 weight per cent, to separation equipment, usually a centrifuge, one cannot economically utilize a stream containing only small quantities of crystals. This is obvious in as much as a centrifuge can handle only so much liquid per unit of time and the greater quantity of crystals per volume of liquid the more efficient is its operation.

Of the crystallizers referred to in this specification or modifications thereof, which may be used to advantage suitable examples may be found in the "Chemical Engineers Handbook," pages 1792–3, second edition, 6th impression, edited by John H. Perry and printed by the McGraw-Hill Book Company, Inc.; or in the following co-pending applications: Serial No. 97,467, filed June 6, 1949, of G. W. McCullough, and Serial No. 112,589, filed August 26, 1949, of Worth Gray, issued as Patent No. 2,623,814.

An object of this invention is to provide an improved process of crystallization.

Another object of this invention is to provide an improved process whereby a constant range of crystal size may be obtained even though the rate of crystal recovery may be varied.

Another object of this invention is to provide an improved process for the crystallization of organic and inorganic materials.

Still another object of this invention is to prevent or materially reduce salting-up usually accompanying withdrawal of high crystal solids content magma from evaporative crystallization apparatus.

Another object of this invention is to provide a method for withdrawing a crystal magma having a desired crystal content.

Another object of this invention is to provide a process for the crystallization of ammonium salts such as ammonium sulfate and ammonium nitrate.

Other objects and advantages of this invention will be apparent to one skilled in the art from the accompanying disclosure and discussion.

I have discovered a new and improved method for withdrawing a crystal magma from an evaporative type crystallizer similar to those described above by which a magma containing crystals within the desired range of mesh size is withdrawn from the crystal suspension vessel or crystallization zone. In the method of my invention, magma is withdrawn from the lower portion of the crystal suspension vessel through a "salt leg" or similar withdrawal means and is passed by means of a magma pump through a circulating line which has suitable dividing means for recycling all or a portion of the withdrawn magma back to the crystal suspension vessel and for passing a portion of the magma to suitable separation apparatus such as a centrifuge. Broadly, it is within the scope of my invention to introduce the recycled magma to the salt leg by any of the three methods shown in the attached drawing, a discussion of which is given below. In most cases it is desirable to have the magma inlet as near the point of take-off from the suspension vessel as possible so that a high rate of circulation is maintained throughout the whole of the salt leg and adjacent circulating lines. It is even within the scope of my invention to introduce the recycled magma by a suitable conduit into the crystal suspension vessel in such a manner that the flow of material therefrom is directed down and into the salt leg. By operating in such a manner as this, circulation throughout the complete withdrawal piping is maintained at a high level and salting-up is reduced to a minimum. Under some conditions of operation wherein most of the magma withdrawn from the crystal suspension vessel is continually recycled rather than passed to the separation means, some attrition of the crystals may take place thus reducing their average particle size below that which is desired and when this is the case at least a portion of the recycled magma may be introduced to the crystal suspension vessel near the top thereof. Crystals which have been broken or worn small by continual recycle, are allowed to grow by contacting the mother liquor within the suspension vessel thus again building up their size to within the desired range.

The withdrawn magma which is passed to suitable separation means is separated, the mother liquor being removed from the crystals therein, which crystals may be treated as desired. The mother liquor thus obtained is returned to the evaporative crystallization apparatus for further evaporation. Usually this stream is returned either to the evaporation zone or to the crystallization zone from which it is circulated back to the evaporation zone and thus reconcentrated.

The following discussion in conjunction with the attached drawing will serve to exemplify my invention and more specifically disclose the process thereof. Although the discussion is limited to a process for the manufacture of ammonium sulfate by direct neutralization of sulfuric acid with ammonia, this is done merely to make my invention more clear and should in no way be interpreted as a limitation upon my overall process. My process may also be applied with utility to the production, recrystallization, or crystallization from waste liquors and the like of numerous organic or inorganic crystallizable materials, e. g. adipic acid, ammonium nitrate, diammonium phosphate, sodium chloride, citric acid, hydroquinone, zinc sulfate, potassium nitrate, oxalic acid, potassium sulfate, sodium sulfate, tartaric acid, potassium nickel sulfate, potassium bicarbonate, copper sulfate, and many other organic and inorganic materials of crystalline nature.

Refer now to the attached drawing which represents one specific embodiment of my invention, the apparatus elements being shown in elevation and the flow being shown diagrammatically.

As is apparent from a comparison of the drawing and the evaporative crystallizers referred to hereinabove, this apparatus is a modification of the Oslo type of crystallizer.

Number 10 is an evaporation zone for removing water from an ammonium sulfate containing liquor so as to supersaturate the liquor and remove the heats of reaction and crystallization. This particular evaporator may be operated at subatmospheric pressure by the use of a barometric condenser 16 wherein water vapor removed via line 19 is condensed by contacting with water introduced via line 17. The condensed liquid is removed from the condenser via line 18. Uncondensed gases, such as air, are removed from condenser 16 via line 14 by means of aspirator 12 through which steam, as the aspirant, is passed via line 11. These uncondensed gases are removed from the aspirator along with the steam via line 13.

The liquor which is concentrated to supersaturation in evaporation zone 10 is passed therefrom by means of conduit 20 which is a barometric leg extending down into crystallizer 21 to a point near the bottom thereof. In this manner, the supersaturated ammonium sulfate solution or solution of other crystallizable material contacts the suspension of crystals in and near the bottom of the crystallizer causing them to grow rather than forming new crystals and thus relieving the supersaturation of the liquor. As the crystals grow they become heavier and settle towards the bottom of the crystallizer, the heaviest crystals settling fastest. The liquor after passing through the suspension of crystals is saturated and is relatively free of crystals. This liquor is withdrawn over weir 22 and through conduit 23 by means of pump 24 and is passed back to evaporation zone 10 where it again becomes supersaturated.

In this particular embodiment of my invention the crystallizable material is produced within the evaporative crystallization apparatus; however this is not a prerequisite of my invention. The crystallizable material may be made outside of the crystallization apparatus in any manner desired and the scope of my invention is intended to be broad enough to cover this aspect. Referring back to the drawing again, sulfuric acid and water are introduced to conduit 23 below pump 24 via lines 26 and 29 respectively. The water is supplied to remove the heats of reaction and crystallization generated by the direct neutralization of ammonia and acid and by the formation of crystals. Ammonia to be reacted with the sulfuric acid is introduced to line 23 above pump 24 by means of line 27. Any suitable means for distributing the ammonia evenly throughout the liquor passing upward through conduit 23 may be used. For example, the sparging apparatus of co-pending application Serial No. 97,467 may be used with success or the sparging device of co-pending application Serial No. 114,160, filed September 6, 1949, of R. K. Simms may also be used with utility. By continuously introducing reactants or a solution of crystallizable material the process of crystallization is maintained continuous. Number 30 indicates a drain in the bottom of the crystallization apparatus.

Crystal magma, i. e. a suspension of crystals in mother liquor is withdrawn from zone 21 through conduit 31 and salt trap 32 is passed through line 33 by means of magma pump 47. In accordance with my invention at least a portion of this magma is passed from line 33 through line 34 back to the crystal withdrawal means. Specifically, this magma may be returned at any one or a combination of one or more of the following three lines. In one embodiment of my invention the magma is returned to salt trap 32 via line 35. In another embodiment of my invention, which in many cases has somewhat greater utility than the above embodiment, the magma is introduced to withdrawal conduit 31 near the top thereof by means of line 36. In still a third embodiment of my invention the magma may be returned by means of line 37 which extends into the crystallization zone at a point such that it may be directed into the mouth of conduit 31.

Line 38 is provided for returning crystal magma into the top of the crystallization zone, for example when it has been found that the crystals have been reduced in size due to attrition within the circulating lines 33, 34 and 31, salt trap 32, and pump 47. The desired quantity of magma to be separated is withdrawn from line 33 through line 39 and is passed therefrom to centrifuge or other separating equipment 40. Suitable controls for regulating the flow of magma through line 39 such as valves and the like are used in controlling the flow of the thus withdrawn magma. Separated crystals as of ammonium sulfate are withdrawn from centrifuge 40 via line 41 and are handled as desired. Mother liquor is removed from the centrifuge via line 42 and is returned to the crystallization zone. Often the liquor is passed to a storage unit such as mother liquor storage 46 from which it is passed via line 30 and pump 43 to the crystallization zone as desired. Lines 44 and 45 are provided as overflow and emergency overflow lines leading from the crystallization zone of the evaporative crystallizer to the mother liquor storage tank.

By operating in the fashion described hereinabove, a high rate of circulation through the magma withdrawal lines may be maintained thus preventing or substantially reducing the salting-up of these lines which usually occurs when normal flow rates are used. In addition, a magma stream of the desired crystal solids content may be continuously withdrawn and passed to suitable separation means thus getting maximum separating efficiency from the equipment used. When it is necessary to shut down or greatly reduce the operation of the separating apparatus such as a centrifuge, such shutdown would ordinarily cause a reduction in flow of magma through the withdrawal lines thus causing rapid salting up. One of the advantages of my invention is that such procedure is no longer necessary. All that need be done is recycle a greater quantity of magma through the withdrawal lines thus providing a flow rate sufficient to prevent salting up.

Still another advantage of my invention is noted when there is no net production of crystals in a crystallizer. When this situation arises, the magma already in the withdrawal lines is recycled thus preventing salting-up due to settling out of crystals when flow is stopped or reduced. Further, by means of my invention crystals of a relatively uniform size may be obtained by merely controlling the withdrawal of magma from the crystallization zone.

Although my process has been described in terms of one particular modification it is understood that various changes may be made without departing from the spirit and scope of the disclosure and of the claims.

I claim:

1. A process for the operation of an evaporative crystallization apparatus of the type described which comprises withdrawing a magma of crystals and mother liquor from a crystallization zone, recycling at least a portion of this magma below the point of withdrawal from the evaporative crystallization zone, continuously circulating the magma through the withdrawal and recycle lines at a rate greater than that at which the magma is withdrawn from these lines and separated into crystals and mother liquor, and by said rapid circulation reducing the tendency of salting-up in the withdrawal lines, and controlling the size of said crystals in said magma by recycling the desired amount of said magma into the top of said crystallization zone to provide growth of said crystals in said magma to the desired size.

2. In an evaporative crystallization process for the production of crystalline materials wherein a magma of crystals and mother liquor is withdrawn from the evaporative crystallization zone through a salt leg, the improvement which comprises recycling at least a portion of withdrawn magma back to the salt leg and continuously circulating the magma through the withdrawal lines, recycle lines and salt leg at a rate greater than that at which magma is taken from said lines for separation into crystals and mother liquor, and controlling the size of said crystals in said magma by recycling the desired amount of said magma into the top of said crystallization zone to provide growth of said crystals in said magma to the desired size.

3. A process according to claim 2 wherein the mother liquor separated from the crystals is returned to the evaporative crystallization zone.

ELWYN C. AYRES.

References Cited in the file of this patent

UNITED STATES PATENTS

| Number | Name | Date |
| --- | --- | --- |
| 743,352 | Trump | Nov. 3, 1903 |
| 2,330,221 | Kermer | Sept. 28, 1943 |
| 2,424,207 | Otto | July 15, 1947 |
| 2,516,832 | Rosenbloom | July 25, 1950 |